Dec. 26, 1922. 1,439,855
W. WESTBURY.
APPARATUS FOR THE MANUFACTURE OF GLASS CANES.
FILED FEB. 16, 1920.

Witnesses
Inventor
William Westbury

Patented Dec. 26, 1922.

1,439,855

UNITED STATES PATENT OFFICE.

WILLIAM WESTBURY, OF OKMULGEE, OKLAHOMA.

APPARATUS FOR THE MANUFACTURE OF GLASS CANES.

Application filed February 16, 1920. Serial No. 359,033.

*To all whom it may concern:*

Be it known that I, WILLIAM WESTBURY, a citizen of the United States, residing at Okmulgee, in the county of Okmulgee and State of Oklahoma, have invented certain new and useful Improvements in Apparatus for the Manufacture of Glass Canes, of which the following is a specification.

The invention relates to the manufacture of canes of glass or analogous vitreous material, the process being the same whether the canes are solid or tubular.

In accordance with the method, the glass or like material in a molten state is drawn therefrom in a cane and simultaneously cooled, the initial cooling at or near the surface of the molten glass being rapid to set the cane by a chilling action and the subsequent cooling being gradual to prevent the cane from becoming too brittle. By varying the effective temperatures and the speed of the draw, either or both, the diameter of the cane produced may be regulated.

The molten glass or kindred material may be held in a pot, tank furnace, fore-hearth, dog-house or other container. A portion of the surface of the molten glass is chilled and the cane is drawn from the chilled spot and is initially set by a rapid cooling and subsequently gradually cooled.

The method is carried out by the apparatus shown in the accompanying drawings, in which:—

Corresponding and like parts are referred to in the following description and indicated in the several views of the drawings by like reference characters.

Figure 1:
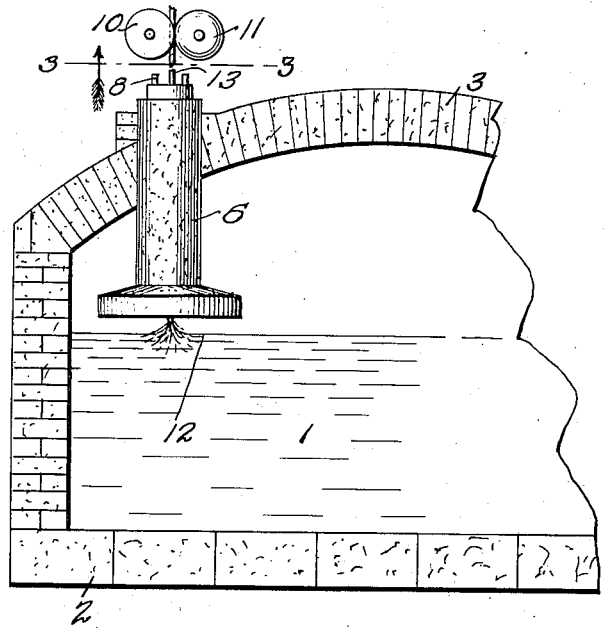
Figure 1 is a sectional detail of part of the tank furnace illustrating the cane forming mechanism in co-operative relation therewith.
Figure 2:
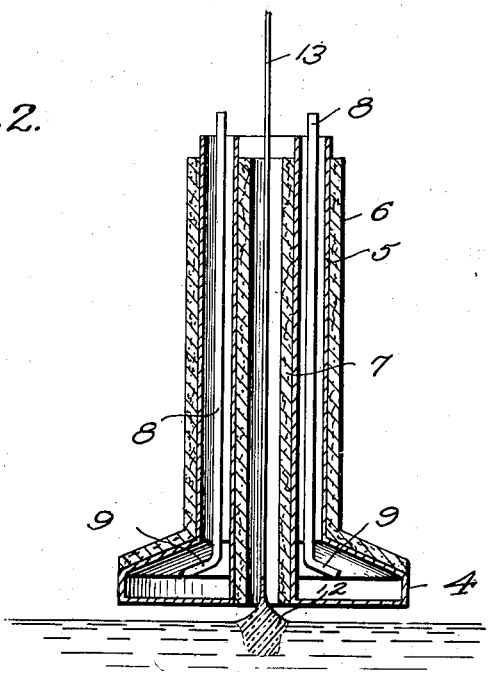
Figure 2 is an enlarged sectional view of the cooling means.
Figure 3:
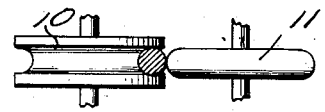
Figure 3 is a plan view of the drawing rolls.

The numeral 1 designates a body or molten glass or analogous vitreous material. This molten glass may be held in any suitable container such as a pot, tank furnace, fore-hearth, or dog-house or extension of the tank. The drawings illustrate a tank furnace 2 the corner 3 of which is provided with an opening to receive a part of the cane forming mechanism. In carrying out the invention, a portion of the surface of the molten glass is cooled and the cane is drawn from the spot thus cooled, and in the initial step of formation, the cane is rapidly cooled to insure a setting thereof. The subsequent cooling of the cane is gradual to prevent the complete article from being brittle which would necessitate a subsequent annealing.

The annealing process is obviated by the gradual cooling of the cane after the initial chill, whereby the diameter of the cane is fixed. In the successful practice of the invention, a tubular body is employed and the same is vertically adjustable with reference to the surface of the molten glass. It is also necessary that drawing means be provided to keep the cane in motion and to draw the same continuously from the body of the molten glass. The tubular body comprises a head 4 and a stem 5. The head 4 is preferably of circular form and is relatively flat and decreases in depth from a central point toward its outer edge. The stem 5 like the head 4 is hollow besides being of tubular formation so that the cane may pass freely through the head and stem. The size of the tubular body will depend upon the diameter of the cane to be produced. It should also be remembered that the distance of the head 4 from the surface of the molten glass as well as the speed of the draw are factors governing the diameter of the cane to be produced. If the draw is uniform the diameter of the cane within certain limits may vary by adjusting the tubular body to a greater or less distance from the surface of the molten glass. As the tubular body occupies a relatively fixed position after being set, the diameter of the cane within certain limits may vary by changing the speed of the draw. It will thus be understood that the diameter of the cane may be regulated by either adjusting the elevation of the tubular body or by varying the speed of the drawing rolls or by a combined setting of both. The tubular body may be of any construction, it being preferred to form the same of metal. The exterior of the tubular body may be protected by a covering 6 of some suitable refractory material such as fire clay. The tubular body may be adjusted vertically in the corner 3 of the furnace in any manner and may be retained in the adjusted position by frictional contact with the walls of the opening or in any preferred way. A protector 7 is disposed within the tubular body and preferably consists of fire clay or other suitable refractory material. The protector 7 is of tubular form and is vertically adjustable with reference to the tubular body and serves in a measure to admit of regulating the cooling action on the cane or formation of the latter. The protector 7 may be adjusted in any manner and retained in the adjusted position by frictional engagement with the inner wall of the tubular body or in any preferred way. A cooling medium is supplied to the interior of the stem 5 and head 4 comprising the tubular body. The cooling medium may be fluid of any nature, but it is preferred to utilize water which is circulated through the tubular body being supplied to the lower portion thereof and discharged from the upper part thereof. Pipes 8 are utilized as means for supplying the cooling medium to the interior of the tubular body. In order that the tubular body may be uniformly cooled the pipes 8 are disposed in such a manner as to equalize the cooling medium. The lower ends of the pipes 8 are outwardly curved as indicated at 9 so as to insure delivery of the cooling medium to the outer portion of the head 4. In order that the head 4 may be properly cooled its outer portion is of less depth than the central portion. The cooling medium discharged from the pipes 8 circulates to the outer edge of the head 4 and returns and passes upwardly through the stem 5 and discharges from the upper end thereof. The receiving ends of the pipes 8 may be connected in any manner to a source of water supply and the water discharged from the upper end of the tubular body may be conveyed therefrom in any convenient manner to a suitable point of discharge as will be readily understood.

Drawing rolls 10 and 11 are disposed above and in line with the stem of the tubular body. The drawing rolls 10 and 11 are adapted to be operated in any preferred way so as to advance the cane gripped between their opposed or meeting portions. One of the drawing rolls as 11 is grooved in its outer edge whereas the companion drawing roll 10 has its outer edge of convex form. The drawing rolls are designed to grip the cane and draw the same from the container and advance the product during the formation thereof whereby the process is rendered continuous. The drawing rolls are disposed so that the cane is retained centrally of the tubular body so that the cooling action is uniform.

In practicing the invention the molten glass 1 has a portion of its surface cooled as indicated at 12 and the cane 13 is drawn from the center of the cooled spot 12 and passes upwardly through the tubular body and between the drawing rolls. It is to be understood that the drawing rolls may be provided in sufficient number to insure a positive speed and delivery of the cane 13. The cooling medium is supplied to the tubular body by means of pipes 8. The tubular body is adjusted so that the lower side of the head 4 is spaced from the surface of the molten glass the required distance which is determined at the outset by a properly conducted test. The speed of the drawing rolls is likewise determined so that the cane produced is of uniform diameter this being essential. The present invention is designed more particularly for producing the glass rods used as supporting means for the filaments of an incandescent electric lamp but it is to be understood that a cane may be produced for any desired purpose and said cane may be solid or tubular as required. After the tubular body and drawing rolls have been properly adjusted a wire or other form of bait is passed downwardly between the drawing rolls and through the tubular body and is introduced into the molten mass of glass, and held therein until the glass adheres thereto. The cooling medium is circulated through the tubular body so as to produce the cool spot 12 which is highly important to the successful operation of the process and mechanism.

After the glass has adhered to the end of the wire or bait immersed therein the drawing rolls are set in motion thereby lifting the rod or bait and elevating the glass adhering thereto, said glass being drawn from the molten mass in the form of a cane or rod which is quickly cooled at or near the surface of the molten mass so as to set the cane, the latter being subsequently cooled in its passage through the stem of the tubular body. It will be observed that the process is continuous so long as the apparatus is in operation.

Having thus fully described my invention what I claim as new and desire to secure by Letters Patent, is:—

1. An apparatus for producing a cane from molten glass or like material, a tubular body, means for circulating a cooling medium through the tubular body, and a protector adjustable within the tubular body to regulate the application of the cooling action on the cane during its process of formation.

2. An apparatus for producing a cane from molten glass or like material, a tubular body comprising a hollow head of flattened form decreasing in depth from the center outwardly towards its edge, and a centrally disposed hollow stem rising from the head, a protector adjustable within the tubular body and means for circulating a cooling medium through the hollow body and delivering the same thereto within the head and admitting of a discharge thereof at the upper or outer end of the hollow stem.

In testimony whereof I affix my signature in presence of two witnesses.

WILLIAM WESTBURY.

Witnesses:
 FRANK J. ANDREWS,
 A. L. WESTBURY.